United States Patent Office 3,709,841
Patented Jan. 9, 1973

---

3,709,841
SULFONATED POLYARYLETHERSULFONES
Jean-Pierre Quentin, Lyon, France, assignor to Rhone-Poulenc S.A., Paris, France
Filed Apr. 28, 1970, Ser. No. 32,535
Claims priority, application France, Apr. 30, 1969, 6913810
Int. Cl. C08g 23/00, 23/20
U.S. Cl. 260—2.2 R    8 Claims

ABSTRACT OF THE DISCLOSURE

Novel sulphonated polyarylether-sulphones are useful as cation-exchange resins especially for ion-exchange membranes useful in osmosis and reverse osmosis.

---

This invention relates to polysulphones, their preparation, and their use; and more particularly to cation exchange resins derived from polysulphone, polymers, membranes derived from such resins, and their application.

Ion exchange membranes have achieved considerable industrial importance because they can be used in the solution of numerous problems, in particular the desalination of seawater and other saline liquids, and in the production of certain fuel piles.

Certain particular uses or particular conditions of use of the membranes require good resistance to various external agents such as acids, alkalis and oxidising agents. Thus the membranes of electrodes (membranes constituting one of the walls of the anode or cathode compartments of an electrodialyser) must be able to resist acid or alkaline reagents, and the fractionation by electrodialysis or osmosis of saline solutions containing oxidising agents requires membranes resistant to these oxidising agents.

New ion exchange resins have now been discovered which contain units of the formula:

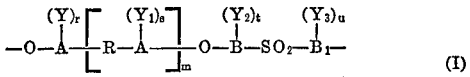

(I)

in which A, B, and $B_1$ which may be identical or different, represent aromatic radicals of which at least one is substituted by a hydroxysulphonyl radical, Y and $Y_1$, which may be identical or different, represent substituent radicals which are inert to sulphonation, $Y_2$ and $Y_3$, which may be identical or different, represent electron acceptor radicals, $r$, $s$, $t$ and $u$, which may be identical or different, represent integers of 0 to 4 inclusive, at least one of them being less than 4, $m$ is 0 or 1, and R represents a valency bond, —CO—, —O—, —SO$_2$—, or a divalent organic hydrocarbon radical.

By way of illustration, the radicals A, B and $B_1$ can represent phenylene radicals, such as the p-phenylene radical, with at least one of these radicals being substituted by one or more hydroxysulphonyl radicals (—SO$_3$H, also called sulphonic groups). Y and $Y_1$ can represent alkyl or alkoxy radicals of 1 to 4 carbon atoms each, or halogen atoms (F, Cl, Br or I). $Y_2$ and $Y_3$ can represent nitro, phenylsulphonyl, alkylsulphonyl, trifluoromethyl, nitroso or pyridyl. If R represents a divalent hydrocarbon radical, it can represent an alkylene or alkylidene radical which, for example, may possess 1 to 7 carbon atoms, or a cycloalkylene radical which, for example, may possess 5 to 7 carbon atoms, or an arylene radical such as phenylene or a methylphenylene radical.

These ion exchange resins are obtained, in accordance with the invention, by sulphonating polyarylethersulphones containing units of the formula:

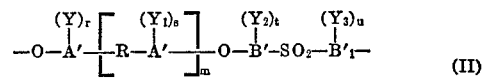

(II)

in which Y, $Y_1$, $Y_2$, $Y_3$, R, $m$, $r$, $s$, $t$, and $u$ are as defined above and A', B' and $B'_1$, which may be identical or different, represent aromatic radicals, especially phenylene radicals, such as p-phenylene. At least one of the radicals A', B' and $B'_1$ must differ from the radicals A, B and $B_1$ respectively, because at least one of the radicals A, B or $B_1$ must be substituted by a hydroxysulphonyl radical.

When the sulphonation of the polyarylethersulphone of Formula II is incomplete, units of Formula II of the starting polyarylether-sulphone may persist in the ion exchange resin obtained. The starting polyarylether-sulphones of Formula II are described in French Pat. No. 1,407,301.

Reagents which can be used for the sulphonation include chlorosulphonic acid, sulphur trioxide, addition products of sulphur trioxide with Lewis bases containing oxygen as an electron donor atom, sulphuric acid, and oleum (i.e. a solution of sulphur trioxide in sulphuric acid). Chlorosulphonic acid and sulphur trioxide are the preferred sulphonation reagents.

According to the preferred process, the sulphonation is effected at a temperature of from —50 to +80° C., preferably between —10 and +25° C., in solution in a solvent for the polyarylether-sulphones, which is inert towards sulphonation reactions. Suitable solvents of this type are chlorinated solvents such as methylene chloride, chloroform, 1,2-dichloroethane and 1,1,2,2-tetrachlorethane. The sulphonating agent is generally used in amount such that the ratio of the number of sulphur atoms of the sulphonating agent to the number of sulphur atoms of the polyaryethersulphone is between 0.4:1 and 5:1, preferably between 0.6:1 and 2:1.

Regardless of the process by which the polyarylether-sulphones are sulphonated, the amount of sulphonic acid groupings attached can be modified by adjusting the sulphonation conditions and in particular the temperature, the duration of reaction, and the concentration of the reagents.

The ion exchange resins according to the invention contain an amount of sulphonic acid groupings of between 0.1 and 5 milliequivalents per gram of dry resin. They can be used to form diaphragms separating compartments in an electrodialyser. To separate the compartments which are not located at the ends of an electrodialyser, membranes based on resins in which the sulphonic acid grouping content is between 1 and 2 milliequivalents per gram of dry resin are preferentially used. To form electrode membranes, resins containing an amount of sulphonic acid groupings of less than 1 milliequivalent per gram are also suitable.

The number of units of Formulae I and II contained in a macromolecular resin chain according to the invention is in general, and on average for any particular sample of resin, greater than 30 and preferably between 50 and 80.

Since the resins of the invention are generally soluble in polar solvents such as dimethylformamide (DMF) and nitrobenzene, the membranes are advantageously prepared by casting a solution of the resin on a surface having the shape desired of the membrane, followed by evaporation of the solvent. Reinforced membranes are obtained by casting onto a screen such as a woven fabric or grid.

In addition to their resistance to alkaline, acid and oxidising agents, the new resins show good dimensional stability towards aqueous solvents.

Finally, the new resins can be crosslinked, for example by reaction with dihalogenated hydrocarbons in the presence of Friedel-Crafts catalysts.

The new resins can be used for all applications which require the presence of cation exchange resins especially when the latter are required to be resistant to acid or basic agents and/or to high temperatures. This is especially the case for the catalysis of organic reactions.

The new ion exchange resins in the form of membranes can be used in fuel piles and in electrodialysis, especially in the form of membranes which define the cathode compartment of an electrodialyser. They can also be used in osmosis and reverse osmosis.

The various constituents of solutions can be fractionated by direct or reverse osmosis with the aid of semi-permeable membranes, and it has been found that it is advantageous to use for this purpose semi-permeable membranes made from the sulphonated polyarylether-sulphones of this invention.

This process of fractionation by osmosis can be applied to the most diverse solutions, for example the following: saline solutions such as seawater and water used in industry; solutions in which the solute is an organic molecule or macromolecule, such as sugar solutions and solutions containing enzymes, proteins, nucleic acids and other heat-labile products; solutions which simultaneously contain salts and organic molecules such as digestive juices, sugar liquors, fruit juices, meat juices, and whey. All these solutions can also contain suspended insoluble constituents.

The fractionation by osmosis may be complete or partial; depending on the case in question, the desired purified product may be the solvent or the solute; in the latter case, one is thus dealing with a concentration or enrichment process. If the solute is macromolecular, the osmosis is sometimes described by the name of ultra-filtration.

The fractionation of constituents of a solution by osmosis using semi-permeable membranes is a technique which is known in general terms. The osmosis can be direct or reverse osmosis. The technique of direct osmosis consists of introducing the solution to be fractionated or enriched into one of the compartments of a cell divided into two by a semi-permeable membrane, the second compartment being filled with the solvent of the said solution, or with a solution of lower osmotic pressure than that of the first compartment; a migration of the solvent from the compartment containing the solution of lowest osmotic pressure towards the compartment containing the solution of highest osmotic pressure is then observed.

The technique of reverse osmosis consists of applying a pressure to a solution on one side of a semipermeable membrane and on the other side of the said membrane collecting the constituent or constituents of the original solution which have migrated across the membrane. By way of example, the constituent which migrates across the semi-permeable membrane is generally water if the original solution is an aqueous solution of a salt or sugar.

The pressures which are applied in reverse osmosis to the solution to be fractionated are generally between 30 and 150 bars and preferably between 60 and 110 bars.

Suitable apparatus in which the new sulphonated polyarylether-sulphone can be used as membranes may be of any known type. In particular, it is possible to use the various apparatus described by Ulrich Merten in "Desalination by Reverse Osmosis," pages 239 to 270 (1966; Ed. The Riverside Press).

The sulphonated polyarylether-sulphone membranes can be used in a flat form or in a tubular form, or even in the form of hollow fibres. They can be used as such or combined with a reinforcing support, e.g. membranes deposited on screens or membranes formed as a thin film of sulphonated polyarylether-sulphone deposited by electrophoresis on a porous support.

The performance of these membranes, and especially their permeation rate, can vary under the influence of various factors, especially their thickness and their structure. For example, it is possible to use asymmetric membranes, that is to say membranes possessing a dense layer which plays the role of a semi-permeable membrane of low thickness, and a porous layer playing the role of a reinforcing support. Such membranes can be prepared by casting a solution of a sulphonated polyarylether-sulphone and then coagulating one of the faces of the solvent-impregnated film thus obtained; this coagulation can for example be effected by lowering the temperature or by the action of a non-solvent.

The new membranes are of sufficient chemical stability to be usable in the fractionation or enrichment of acid or alkaline solutions; they also show a good transfer ratio $$\left[100\left(1-\frac{\text{concentration of the solution after osmosis}}{\text{concentration of the solution before osmosis}}\right)\right]$$

Furthermore, where the membranes have a simple structure, that is to say a non-asymmetric structure, they have a transfer ratio which makes it possible to use them directly in the form of hollow fibres.

In order to determine the properties of the membranes prepared, the following measurements were carried out:

(a) Electrical substitution resistance: the electrical substitution resistance of a given membrane area is the variation in electrical resistance of a liquid cylinder if the membrane is substituted for a slice of liquid of the same thickness and the same area as the membrane, in a position at right angles to the axis of the cylinder. In the present case this substitution resistance is measured in an 0.6 M aqueous solution of KCl; it is expressed in ohm.cm.$^2$.

(b) Selective permeability: this is the ability of the membrane only to allow cations to pass, whilst excluding anions. This selective permeability is deduced by calculation from measurement of the electromotive force A which exists between two aqueous KCl solutions, respectively 0.4 M and 0.8 M, separated by the membrane in question, which has beforehand been saturated with an 0.6 M aqueous solution of KCl.

The formula which gives the selective permeability as a percentage is:

$$\frac{P}{100}=\frac{\bar{t}^+ - t^+}{1-t^+}$$

in which $t^+$ is the transport number of K$^+$ ion and $\bar{t}^+$ is the transport number of this same ion in the membrane. $\bar{t}^+$ is given by the formula:

$$\bar{t}^+=\frac{E+Eo}{2Eo}$$

in which $$Eo=\frac{RT}{F}\ln\frac{a_1}{a_2}$$

wherein

R = the gas constant
T = absolute temperature
F = Faraday constant (96,489 coulombs per gram equivalent)

$a_1$ = activity of the electrolyte in the more concentrated compartment (calculated from the concentration of the electrolyte and the coefficient of activity)

$a_2$ = activity of the electrolyte in the less concentrated compartment (c) Bursting strength: this is measured in accordance with standard specification PN AFNOR Q 0314 which relates to testing paper and cardboards. A membrane, fixed on a supporting frame which leaves a free area of 10 cm.$^2$, is subjected to the action of a hydraulic pressure via a rubber membrane. The hydraulic pressure (in bars) after bursting is measured, as is the deflection in mm. of the incurved membrane at the moment of rupture.

(d) Theoretical exchange capacity: the membrane is washed with a N/10 sodium carbonate solution and the amount of sodium carbonate which has not been absorbed is determined. The number of mols of sodium carbonate retained by the resin is deduced from this, by difference; the ratio of this number of mols (expressed in milliequivalents, abbreviated meq.) to the weight of dry resin is the theoretical exchange capacity of the membrane.

The examples which follow illustrate the invention.

EXAMPLE 1

A solution A is made by dissolving 12.5 g. of polyarylether-sulphone in 150 cm.$^3$ of 1,2-dichlorethane (DCE). The polyarylether-sulphone used consists of a plurality of units of formula:

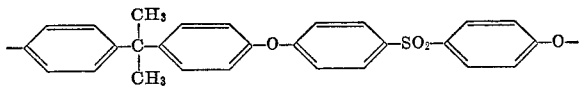

and has a flow speed in the molten state (measured according to standard specification ASTM D 1238) of 0.7 g./minute. A solution B is made up by dissolving 3.3 g. of chlorosulphonic acid (ClSO$_3$H) in 30 cm.$^3$ of DCE.

The two solutions A and B are simultaneously and gradually (over the course of one hour) introduced, with vigorous stirring (436 r.p.m.), into a 500 cm.$^3$ flask equipped with a stirrer, kept at $-10°$ C. and containing 50 cm.$^3$ of DCE. The stirring and the temperature are maintained for a further 4 hours. The precipitate is filtered off, washed with 100 cm.$^3$ of DCE, and dissolved in 50 cm.$^3$ of dimethylformamide (DMF) at ambient temperature. This solution is poured into 500 cm.$^3$ of water, the mixture is filtered, and the product is washed 3 times with 300 cm.$^3$ of water each time, and dried at 60° C. under 100 mm. of mercury. 6 g. of sulphonated polysulphone are thus obtained.

3 g. of this sulphonated polysulphone are dissolved in 20 cm.$^3$ of DMF at ambient temperature. The solution is cast at ambient temperature on a 10 cm. square glass plate, and dried at 50° C. A membrane $M_1$ 0.2 mm. thick is thus obtained, having a theoretical exchange capacity of 0.6 meq./g. of dry resin, a selective permeability of 96%, a substitution resistance of 48Ω·cm.$^2$, and a bursting pressure of 6.7 bars (deflection: 9.3 mm.). On prolonged immersion in water, the membrane $M_1$ shows a linear elongation of 1%.

After immersion in 2 N sulphuric acid for 168 hours at 70° C., the membrane $M_1$ has a selective permeability of 89%, a substitution resistance of 33Ω·cm.$^2$, and a bursting pressure of 5 bars (deflection: 12.7 mm.). After immersion in normal sodium carbonate solution for 168 hours at 70° C., the membrane $M_1$ has a selective permeability of 87%, a substitution resistance of 24Ω·cm.$^2$, and a bursting pressure of 4.9 bars (deflection: 4.9 mm.). After immersion in a 3 N nitric acid bath for 168 hours at 25° C. and then for 6 hours at 100° C., the membrane $M_1$ has a selective permeability of 89%, and a substitution resistance of 33Ω·cm.$^2$.

EXAMPLE 2

Two solutions A and B are prepared as in Example 1. The two solutions A and B are introduced simultaneously and gradually (over the course of one hour), with vigorous stirring (436 r.p.m.), into a 500 cm.$^3$ flask equipped with a stirrer, kept at 0° C. and containing 50 cm.$^3$ of DCE. The stirring and the temperature are maintained for a further 4 hours. The precipitate is filtered off, washed with 100 cm.$^3$ of DCE, and dissolved in 50 cm.$^3$ of DMF. This solution in DMF is poured into 500 cm.$^3$ of water. The mixture is concentrated at 50° C., under partial vacuum (20 mm. of mercury) to a weight of 35 g. 100 cm.$^3$ of acetone are ten added, and the resulting precipitate is filtered off and washed 3 times with 200 cm.$^3$ of acetone each time, and dried at 60° C. under 100 mm. of mercury. 16.2 g. of sulphonated polysulphone are thus obtained.

9 g. of this sulphonated polysulphone are dissolved in 90 cm.$^3$ of DMF at 60° C. The solution is cast onto a 300 cm.$^2$ glass plate and dried at 50° C. The membrane $M_2$ obtained has a thickness of 0.19 mm., a theoretical exchange capacity of 1 meq./g., a selective permeability of 88%, a substitution resistance of 6Ω·cm.$^2$, and a bursting pressure of 4 bars (deflection: 9 mm.).

After 168 hours in 2 N sulphuric acid at 70° C., the membrane $M_2$ has a selective permeability of 84%, a substitution resistance of 3Ω·cm.$^2$, and a bursting pressure of 5.5 bars (deflection: 10.5 mm.). After 168 hours at 70° C. in normal sodium carbonate solution, the membrane $M_2$ has a selective permeability of 85%, a substitution resistance of 3Ω·cm.$^2$, and a bursting pressure of 3.5 bars (deflection: 6.5 mm.). After immersion in 3 N nitric acid for 168 hours at 25° C. followed by 6 hours at 100° C., the membrane $M_2$ has a selective permeability of 82%, a substitution resistance of 8Ω·cm.$^2$ and a bursting pressure of 4.5 bars (deflection: 5 mm.).

EXAMPLE 3

A solution A is prepared as in Example 1 and a solution $B_3$ is prepared by dissolving 2.5 g. of chlorosulphonic acid in 30 cm.$^3$ of DCE. These two solutions A and $B_3$ are introduced simultaneously and gradually (over the course of one hour), with vigorous stirring (436 r.p.m.), into a 500 cm.$^3$ flask equipped with a stirrer, maintained at $+25°$ C. and containing 50 cm.$^3$ of DCE. The processes of sulphonation, isolation and shaping into a membrane are carried out as in Example 2.

A membrane $M_3$ of 0.25 mm. thickness is obtained, having a theoretical exchange capacity of 0.75 meq./g., a selective permeability of 84%, a substitution resistance of 27Ω·cm.$^2$, and a bursting pressure of 6.7 bars (deflection: 8.8 mm.). On prolonged immersion in water the membrane $M_3$ shows a linear elongation of 1%.

After 168 hours at 70° C. in 2 N sulphuric acid, the membrane $M_3$ has a selective permeability of 83%, a substitution resistance of 31Ω·cm.$^2$, and a bursting pressure of 4.2 bars (deflection: 4.5 mm.).

After 168 hours at 70° C. in normal sodium carbonate solution, the membrane $M_3$ has a selective permeability of 87%, a substitution resistance of 21Ω·cm.$^2$, and a bursting pressure of 3.4 bars (deflection: 3.5 mm.).

After immersion in 3 N nitric acid for 168 hours at 25° C. followed by 6 hours at 100° C., the membrane $M_3$ has a selective permeability of 81%, a substitution resistance of 27Ω·cm.$^2$, and a bursting pressure of 4 bars deflection: 3.7 mm.).

EXAMPLE 4

On following the procedure of Example 2, but at a sulphonation temperautre of 25° C., 13 g. of sulphonated polyarylether-sulphone are obtained. 9 g. of this sulphonated polysulphone are dissolved in 90 cm.$^3$ of DMF at 60° C., and the solution is cast at ambient temperature onto a 300 cm.$^2$ glass plate.

A membrane $M_4$ is obtained, having a theoretical exchange capacity of 1.1 meq./g., a thickness of 0.3 mm., a selective permeability of 82%, a substitution resistance of 4Ω.cm.$^2$, and a bursting pressure of 2 bars (deflection: 3 mm.).

EXAMPLE 5

A solution A is prepared as in Example 1, and a solution $B_5$ is prepared by dissolving 2.26 g. of $SO_3$ (obtained by distilling oleum) in 30 cm.$^3$ of DCE.

The two solutions A and $B_5$ are simultaneously and gradually added, over the course of one hour, to 50 cm.$^3$ of DCE maintained at $-10°$ C., with vigorous stirring (436 r.p.m.). The temperature and the stirring are maintained for a further 4 hours. The mixture is filtered and the precipitate is washed with 100 cm.$^3$ of DCE, dried at 25° C. under a partial vacuum (100 mm. of mercury), washed 3 times with 250 cm.$^3$ of water each time, and dried at 60° C. under a partial vacuum (100 mm. of mercury) for 15 hours.

11 g. of a sulphonated polysulphone, having a theoretical exchange capacity of 0.75 meq./g., are obtained.

EXAMPLE 6

1 g. of a sulphonated polysulphone prepared as described in Example 1 is dissolved in 30 cm.$^3$ of DMF at ambient temperature and the solution is cast on a 300 cm.$^2$ glass plate and dried in an oven at 60° C. for 18 hours. The resulting membrane, which has a thickness of 30$\mu$, is detached from the glass plate and immersed in water. It extends linearly by about 1%.

This membrane is used in a reverse osmosis process for the desalination of a brine containing 35 g. of NaCl per litre. To do this, the membrane is introduced into the apparatus shown in the single figure of the accompanying drawings. This apparatus comprises a cylinder 1 combined with a support 2, and containing the brine 3 which is to be desalinated. The semi-permeable membrane 4, in contact with the brine 3, is supported by a porous plate 5 which is not semi-permeable. This porous plate is chosen so as not to cause mechanical deformation of the membrane 4 and not to offer a substantial resistance to the passage of the liquids. Two toroidal gaskets 6 ensure that the apparatus is leakproof. To ensure that the concentration of the brine 3 is uniform, especially near the membrane 4, a magnetic stirrer 7 rotates a magnetic bar 8 separated from the membrane 4 by a protective grid 9.

Various pipes are attached to the apparatus: the pipeline 10 allows the solution to be desalinated to be fed in. The pipeline 11 connects the apparatus to a source of gas under pressure, via the manometer 12. The pipelines 13 and 14 allow material to be withdrawn or the equipment to be emptied, and the pipeline 15 allows the material which has permeated through the membrane 4 to flow out.

The area of the membrane 4 across which permeation can take place is 50.2 cm.$^2$. A pressure of 60 bars is applied to the brine 3, at 24° C., for 47 hours. The material which has permeated is collected at a rate of 0.75 litre/day. m.$^2$, the transfer ratio being 86%.

EXAMPLE 7

A solution $A'_7$ is made by dissolving 12.5 g. of a polyarylether-sulphone similar to that of Example 1 in 100 cm.$^3$ of DCE. A solution $B'_7$ is made up by dissolving 2.26 g. of sulphur trioxide in 50 cm.$^3$ of DCE and then pouring this solution, with stirring, into a mixture of 2.5 g. of dioxane and 50 cm.$^3$ of DCE, kept at $+5°$ C.

The solution $A'_7$ and $B'_7$ are introduced simultaneously and gradually over the course of 10 minutes, with stirring, into a 500 cm.$^3$ flask maintained at $+40°$ C. The temperature and the stirring are maintained for 4 hours 30 minutes. The mixture is filtered and the precipitate is dissolved in 50 cm.$^3$ of DMF at 25° C. The solution is poured into 500 cm.$^3$ of acetone, the mixture is filtered, and the precipitate is washed with three portions of 100 cm.$^3$ of acetone and dried. 10.5 g. of a sulphonated polysulphone having a content of sulphonic acid groupings of 0.89 meq./g. is obtained.

A membrane is prepared as in Example 6 and is used in reverse osmosis at 23° C. under 60 bars for a period of 46 hours. The brine subjected to desalination, and the reverse osmosis apparatus, are the same as in Example 6. The material which has permeated is collected at a rate of 3.4 litres/day.m.$^2$, with a transfer ratio of 94.2%.

EXAMPLE 8

A solution $A'_8$ is made by dissolving 62.5 g. of a polyarylether-sulphone similar to that of Example 1, in 500 cm.$^3$ of DCE. A solution $B'_8$ is made up by dissolving 16.5 g. of chlorosulphonic acid in 150 cm.$^3$ of DCE. The solutions $A'_8$ and $B'_8$ are poured simultaneously over the course of 2 hours 30 minutes, with stirring, into a 1000 cm.$^3$ reactor maintained at 0° C. and containing 100 cm.$^3$ of DCE. Following the previous procedure, 68 g. of sulphonated polysulphone containing 0.8 meq./g. of sulphonic acid groupings are isolated.

A membrane is prepared as in Example 6 and used in reverse osmosis at 23° C. under 60 bars for a period of 41 hours. The brine subjected to desalination and the reverse osmosis apparatus are the same as in Example 6. The material which has permeated is collected at a rate of 1.6 litres/day.m$^2$, with a transfer ratio of 92.3%.

EXAMPLE 9

A solution $A'_9$ is made by dissolving 312.5 g. of a polyarylether-sulphone similar to that of Example 1 in 1625 cm.$^3$ of DCE. A solution $B'_9$ is made up by dissolving 82.5 g. of chlorosulphonic acid in 1625 cm.$^3$ of DCE. The two solutions $A'_9$ and $B'_9$ are poured simultaneously over the course of 1 hour into a 5 litre reactor maintained at $+25°$ C. and containing 500 cm.$^3$ of DMF with stirring. The stirring and the temperature are maintained for 1 hour. Following the previous procedure, 354 g. of sulphonated polysulphone containing 0.82 meq./g. of sulphonic acid groupings are isolated.

A membrane is prepared, and a reverse osmosis process is carried out, as in Example 6, but for a period of 94 hours in place of 47 hours. The material which has permeated is collected at a rate of 4.7 litres/day.m.$^2$ with a transfer ratio of 94%.

EXAMPLE 10

A solution $A'_{10}$ is made by dissolving 1250 g. of a polyarylether-sulphone similar to that of Example 1 in 6500 cm.$^3$ of DCE. A solution $B'_{10}$ is made by dissolving 206 cm.$^3$ of chlorosulphonic acid in 6500 cm.$^3$ of DCE. The two solutions $A'_{10}$ and $B'_{10}$ are poured simultaneously, over the course of 5 hours, into a 25 litre reactor, maintained at $+25°$ C. and containing 4 litres of DCE with stirring. The temperature and the stirring are maintained for a further 20 minutes. The DCE is removed by decantation. The sulphonated polysulphone which has precipitated is dissolved in 4 litres of DMF and precipitated with acetone. After washing and drying as before, 1260 g. of a sulphonated polysulphone containing 0.98 meq./g. of sulphonic acid groupings are obtained.

A membrane is prepared as in Example 6. A reverse osmosis process is carried out at 25° C., under 100 bars and for a period of 23 hours, in the same apparatus as before. The material which has permeated is collected at a rate of 7 litres/day.m.$^2$, with a transfer ratio of 97.5%.

EXAMPLE 11

A membrane prepared as in Example 5 is used in reverse osmosis under 60 bars to concentrate a sugar solution (aqueous solution containing 10% by weight of glucose). The water extracted from the solution through the membrane is collected at a rate of 3 litres/day.m.$^2$ and with a transfer ratio of 94%.

I claim:
1. Shaped or unshaped polymers consisting essentially of recurring units of the general formula:

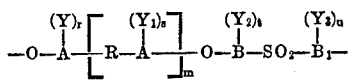

and of recurring units of the general formula:

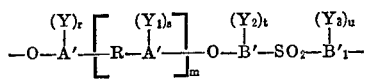

in which A, B, and $B_1$, which may be identical or different, represent arylene radicals of which at least one is substituted by a hydroxysulphonyl radical, A′, B′ and B′$_1$, which may be identical or different, represent arylene radicals, Y and $Y_1$, which may be identical or different, represent substituent radicals which are inert to sulphonation, $Y_2$ and $Y_3$, which may be identical or different, represent electron acceptor radicals, $r$, $s$, $t$ and $u$, which may be identical or different, represent integers of 0 to 4 inclusive, at least one of them being less than 4, $m$ is 0 or 1, and R represents a valency bond, —CO—, —O—, —SO$_2$—, or a divalent organic hydrocarbon radical, the hydroxysulphonyl groups being present in an amount from 0.1 to 5 milliequivalents per gram of dry polymer.

2. Polymers according to claim 1 in which A, B and $B_1$ represent phenylene radicals, of which at least one is substituted by a hydroxysulphonyl radical, A′, B′ and B′$_1$ represent phenylene radicals, Y and $Y_1$ represent alkyl or alkoxy radicals of 1 to 4 carbon atoms or halogen atoms, $Y_2$ and $Y_3$ represent nitro, phenylsulphonyl, alkylsulphonyl, trifluoromethyl, nitroso or pyridyl radicals and R represents a valency bond, —CO—, —O—, —SO$_2$— or an alkylene or alkylidene radical of 1 to 7 carbon atoms, a cycloalkylene radical of 5 to 7 carbon atoms or a phenylene radical.

3. Shaped or unshaped polymers according to claim 2 consisting essentially of recurring units of the general formula:

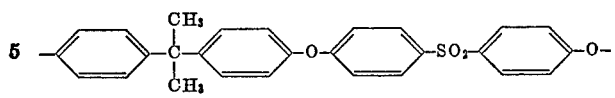

in which at least one of the benzene rings is substituted by one or more sulphonic radicals and of said recurring units in which the benzene rings are not substituted by sulphonic radicals.

4. In a process for the fractionation of a solution by osmosis or reverse osmosis employing an ion exchange membrane which is in flat or tubular form or in the form of hollow fibres, the improvement wherein the ion exchange membrane is made of a polymer as defined in claim 1.

5. A process according to claim 4 wherein the ion exchange membrane is made of a polymer as defined in claim 2.

6. A process according to claim 4 wherein the ion exchange membrane is made of a polymer as defined in claim 3.

7. Ion exchange membranes comprising a polymer as defined in claim 1.

8. Ion exchange membranes according to claim 7 comprising a polymer as defined in claim 2.

References Cited
UNITED STATES PATENTS
3,663,509    5/1972    Bonnard et al.

MELVIN GOLDSTEIN, Primary Examiner

U.S. Cl. X.R.
210—23, 24, 500; 260—49